United States Patent
Kikuchi et al.

(10) Patent No.: US 6,929,836 B2
(45) Date of Patent: Aug. 16, 2005

(54) MULTI-LAYERED PREFORM AND MULTI-LAYERED BOTTLE MANUFACTURED BY USING THE SAME

(75) Inventors: Atsushi Kikuchi, Kanagawa (JP); Yorihisa Hamada, Kanagawa (JP); Makoto Etoh, Kanagawa (JP); Kazunobu Watanabe, Kanagawa (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 0 days.

(21) Appl. No.: 10/697,978

(22) Filed: Oct. 31, 2003

(65) Prior Publication Data

US 2004/0091652 A1 May 13, 2004

Related U.S. Application Data

(63) Continuation of application No. 09/966,729, filed on Oct. 1, 2001, now abandoned.

(30) Foreign Application Priority Data

Sep. 29, 2000 (JP) ........................................ 2000-298059

(51) Int. Cl.$^7$ ............................ B65D 1/02; B29C 43/02; B29C 49/02; B29C 49/08; B29C 49/22
(52) U.S. Cl. .................... 428/35.7; 428/36.6; 428/36.7; 264/296; 264/297.5; 264/299; 264/514; 264/515; 264/531; 264/532; 264/540
(58) Field of Search .............................. 428/35.7, 36.6, 428/36.7; 264/296, 297.5, 299, 514, 515, 540, 531, 532

(56) References Cited

U.S. PATENT DOCUMENTS

| | | |
|---|---|---|
| 3,337,910 A | 8/1967 | West |
| 3,670,066 A | 6/1972 | Valyi |
| 4,191,305 A | 3/1980 | Davis |
| 4,264,558 A | 4/1981 | Jacobsen |
| 4,398,642 A | 8/1983 | Okudaira et al. |
| 4,451,512 A | 5/1984 | Yazaki et al. |
| 4,528,219 A | 7/1985 | Yamada et al. |
| 4,529,372 A | 7/1985 | Saumsiegle |
| 4,535,901 A | 8/1985 | Okudaira et al. |
| 4,675,219 A | 6/1987 | Muneki et al. |
| 4,943,405 A | 7/1990 | Keller et al. |
| 5,068,136 A | 11/1991 | Yoshida et al. |
| 5,356,282 A | 10/1994 | Throne et al. |
| 5,653,265 A | 8/1997 | Nakagawa et al. |
| 5,718,852 A | 2/1998 | Campbell et al. |
| 5,762,854 A | 6/1998 | Valyi |
| 6,074,596 A | 6/2000 | Jacquet |
| 6,077,578 A | 6/2000 | Valyi |

FOREIGN PATENT DOCUMENTS

| | | |
|---|---|---|
| EP | 0 161 625 A2 | 11/1985 |
| EP | 0 278 403 A2 | 8/1988 |
| GB | 2 218 395 A | 11/1989 |
| JP | 39-340 | 1/1939 |
| JP | 45-23330 | 9/1970 |
| JP | 02-134222 A | 5/1990 |
| JP | 7-61656 B2 | 7/1995 |
| JP | 2000-238734 A | 9/2000 |
| WO | WO 95/11801 A1 | 5/1995 |

*Primary Examiner*—Harold Pyon
*Assistant Examiner*—Chris Bruenjes
(74) *Attorney, Agent, or Firm*—Browdy and Neimark, P.L.L.C.

(57) ABSTRACT

A multi-layered perform for substantially preventing the generation of strains and obtaining improved stress cracking resistance with excellent appearance characteristics includes a mouth portion, a body portion and a bottom portion and has at least the body portion and the bottom portion formed of an inner layer, an intermediate layer, and an outer layer by a compression molding. A multi-layered bottle is manufactured by performing a biaxial stretch blow molding of such multi-layered perform. The multi-layered bottle includes a mouth portion a shoulder portion, a body portion and a bottom portion. At least the shoulder portion, the body portion and the bottom portion include an inner layer, an intermediate layer and an outer layer.

11 Claims, 4 Drawing Sheets

MULTI-LAYERED PREFORM AND MULTI-LAYERED BOTTLE MANUFACTURED BY USING THE SAME

RELATED APPLICATIONS

This is a continuation of parent application Ser. No. 09/966,729 filed Oct. 1, 2001, now abandoned.

BACKGROUND OF THE INVENTION

1. Field of the Invention

The present invention relates to a multi-layered preform which is formed by performing a compression molding of a plural kinds of oriented thermoplastic resins and a multi-layered bottle which is formed by performing a biaxial stretch blow molding of the multi-layered preform, and more particularly to a multi-layered preform and a multi-layered bottle having layers each of which has no strain generated by the flow orientation at a bottom portion thereof and also exhibits the excellent environmental stress resistance (ESC property), the excellent impact resistance, the excellent strength and the excellent appearance characteristics of the bottom portion thereof.

2. Description of the Prior Art

Stretch blow molded bottles made of polyester, polypropylene, polyamide or the like, particularly polyester bottles exhibit the excellent transparency and the gas barrier property and hence, the stretch blow molded bottles have been widely used for containing a liquid detergent, a shampoo, a cosmetic, a seasoning such as a soy sauce, a sauce or the like, beer, cola, a carbonic acid beverage such as cider, a fruit juice, a beverage such as mineral water or the like.

On the other hand, with respect to the polyester bottle, for preventing the deterioration of a content due to oxygen from the outside, a multi-layered bottle which forms a gas barrier layer, an oxygen absorption layer or a gas barrier layer containing an oxygen absorption agent therein between an inner layer and an outer layer which are made of polyester layers is used for storing a content which is required to have the preservative property.

Further, for the purpose of recycling the polyester bottles, to recycle used bottles after collecting, multi-layered bottles are manufactured by making use of the recycled bottles as polyester layers which constitute outer layers or as polyester layers which constitute inner layers.

The polyester bottles are, in general, manufactured by performing the stretch blow molding of preforms which are formed by an injection molding. The manufacturing method is roughly classified into a hot parison method and a cold parison method. In the former hot parison method, a bottomed preform which is formed by an injection molding of polyester resin is subjected to the stretched blow molding in a softened state without being completely cooled. On the other hand, in the latter cold parison method, an overcooled bottomed preform having a size considerably smaller than a size of a final shape and having polyester formed in an amorphous state is preliminarily formed by performing the injection molding of polyester resin, then the preform is preheated to a stretching temperature and is stretched by being pulled in the axial direction in a mold for blow molding, and is subjected to the blow stretching in the circumferential direction.

With respect to the shape of the bottomed preform, the preform includes a mouth portion which corresponds to a mouth portion of the bottle and a bottomed cylindrical portion which is to be subjected to the stretched blow molding. To form a longitudinally elongated container, the preform which has a shape generally similar to a shape of a test tube is used. A thread portion which constitutes engaging means with which a sealing opening end or a lid is engaged is, for example, formed in the mouth portion. Further, at the center of the bottom portion, a gate portion which constitutes an inflow opening through which resin flows at the time of an injection molding or a trace of the gate portion is always formed.

In a single-layered preform manufactured by a conventional injection molding, at a gate portion of a bottom portion or in the vicinity of the gate portion, the turbulence of a resin flow is generated and the whitening is liable to occur. Accordingly, there has been a problem that a bottle obtained by performing the biaxial stretch blow molding of the preform exhibits the poor appearance characteristics such as whitening, the crazing or the like of the bottom portion and reduces the impact resistance.

With respect to the multi-layered preform manufactured by the injection molding and the bottle obtained by performing the biaxial stretch blow molding using such a multi-layered preform, since a plurality of resins are injected, the respective flows of the resins become more complicated and this tendency appears particularly noticeably.

Further, with respect to a multi-layered preform obtained by performing an injection molding of oriented thermoplastic resin such as polyethylene terephthalate or the like, even when a body portion is transparent, the cooling efficiency at a gate portion or at a periphery thereof is poor so that these portions are liable to easily suffer from the whitening. Such a phenomenon is called "whitening of gate" in general. It is said that such a phenomenon is generated due to a fact that the oriented thermoplastic resin which is subjected to residual strains caused by the flow orientation has a property to be extremely easily crystallized.

To prevent such whitening of gate, it is necessary to perform the injection molding under a condition that the residual strains caused by the flow orientation is not increased. For example, it has been known that the larger the diameter of the gate or the lower the injection pressure, the possibility of the occurrence of the whitening of gate is decreased.

However, there have been problems that when the diameter of the gate increased, the diameter of a gate residual portion at the bottom portion is increased and hence, the appearance characteristics are worsened and when the injection pressure is reduced, the profiling of the preform is worsened and, at the same time, the injection residence time is prolonged so that the productivity is lowered.

Further, the above-mentioned problems appear outstandingly with respect to the multi-layered bottle obtained by performing the biaxial stretch blow molding of the multi-layered preform. Particularly, at the time of performing the biaxial stretch blow molding, there has been a problem that an interlayer peeling-off is liable to be generated at a center portion or in the vicinity of the center portion of the bottom portion of the bottle so that the impact resistance is drastically deteriorated.

Inventors of the present invention have found that even when the residual strains caused by the flow orientations in respective layers which are generated at the time of performing the injection molding of the multi-layered preform are at a low level which does not bring about the above-mentioned whitening of gate, the multi-layered bottle obtained by performing the biaxial stretch blow molding of the multi-layered preform gives an adverse influence to the homogeneous and uniform stretch property, the crazing property, the environmental stress cracking resistance, the bottle strength and the like at the bottom portion thereof.

Accordingly, it is an object of the present invention to provide a multi-layered preform and a multi-layered bottle which are substantially free from the generation of residual strains caused by the flow orientation at respective layers of a bottom portion, are free from the occurrence of the interlayer peeling-off of respective layers of the bottom portion and ensure the homogeneous and uniform stretching whereby, as a result, the impact resistance and the buckling strength of the bottom portion are enhanced, the excellent environmental stress cracking property at the bottom portion can be obtained, the occurrence of the crazing or the whitening at the time of preservation can be eliminated, and the excellent appearance characteristics can be obtained.

SUMMARY OF THE INVENTION

To solve the above-mentioned drawbacks, according to a first aspect of the present invention, there is provided a multi-layered preform which includes a mouth portion, a body portion and a bottom portion and has at least the body portion and the bottom portion formed of an inner layer, an intermediate layer and an outer layer by a compression molding, wherein, at the center of the bottom portion, a half-width of a diffuse scattering peak by an X-ray diffraction of a surface of the outer layer is larger than a half-width of a diffuse scattering peak by an X-ray diffraction of a surface of the inner layer, and the center of the bottom portion is substantially transparent.

With respect to such a multi-layered preform, it is preferable that one or a plurality of intermediate layers which are made of at least one kind selected from a group consisting of gas barrier resin, recycled resin and heat-resistant resin are completely sealed by the inner layer and the outer layer which are made of polyester. An adhesive resin layer may be interposed at least either between the inner layer and the intermediate layer or between the outer layer and the intermediate layer. Further, the multi-layered preform has neither a gate portion nor a trace of the gate portion in the bottom portion.

Further, as a second aspect of the present invention, there is provided a multi-layered bottle which is manufactured by performing a biaxial stretch blow molding of the above-mentioned multi-layered preform, wherein the multi-layered bottle includes a mouth portion, a shoulder portion, a body portion and a bottom portion, at least the shoulder portion, the body portion and the bottom portion include an inner layer, an intermediate layer and an outer layer, and, at the center of the bottom portion, a half-width of a diffuse scattering peak by an X-ray diffraction of a surface of the outer layer is larger than a half-width of a diffuse scattering peak by an X-ray diffraction of a surface of the inner layer so that the center of the bottom portion is substantially transparent.

With respect to such a multi-layered bottle, it is preferable that one or a plurality of intermediate layers which are made of at least one kind selected from a group consisting of gas barrier resin, recycled resin and heat-resistant resin are completely sealed by the inner layer and the outer layer which are made of polyester. An adhesive resin layer may be interposed at least either between the inner layer and the intermediate layer or between the outer layer and the intermediate layer. Further, the multi-layered preform has neither a gate portion nor a trace of the gate portion in the bottom portion.

After peeling off the inner layer and the outer layer in the vicinity of the center of the bottom portion of the multi-layered preform and multi-layered bottle of the present invention, X-rays are incident in the thicknesswise direction of respective layers and a diffuse scattering peak at an X-ray diffraction is detected in the vicinity of a specific angle of a diffraction angle (2θ). Although this diffraction angle differs depending on the kind of the oriented thermoplastic resin, the diffraction angle is set to a value in a range from 15° to 25° and the diffuse scattering angle is detected in the vicinity of 21° with respect to polyethylene terephthalate (PET).

FIG. 1 is an explanatory view for obtaining the diffuse scattering peak A° and a half-width B° based on the diffuse scattering intensity distribution in the X-ray diffraction. That is, the half-width B° becomes, when a line parallel to an axis of abscissa is drawn such that the line passes a point of ½ of the intensity at the. diffuse scattering peak A°, the distance between two points where this parallel line and the peak intersect each other.

PREFERRED EMBODIMENTS OF THE PRESENT INVENTION

Figure 2:
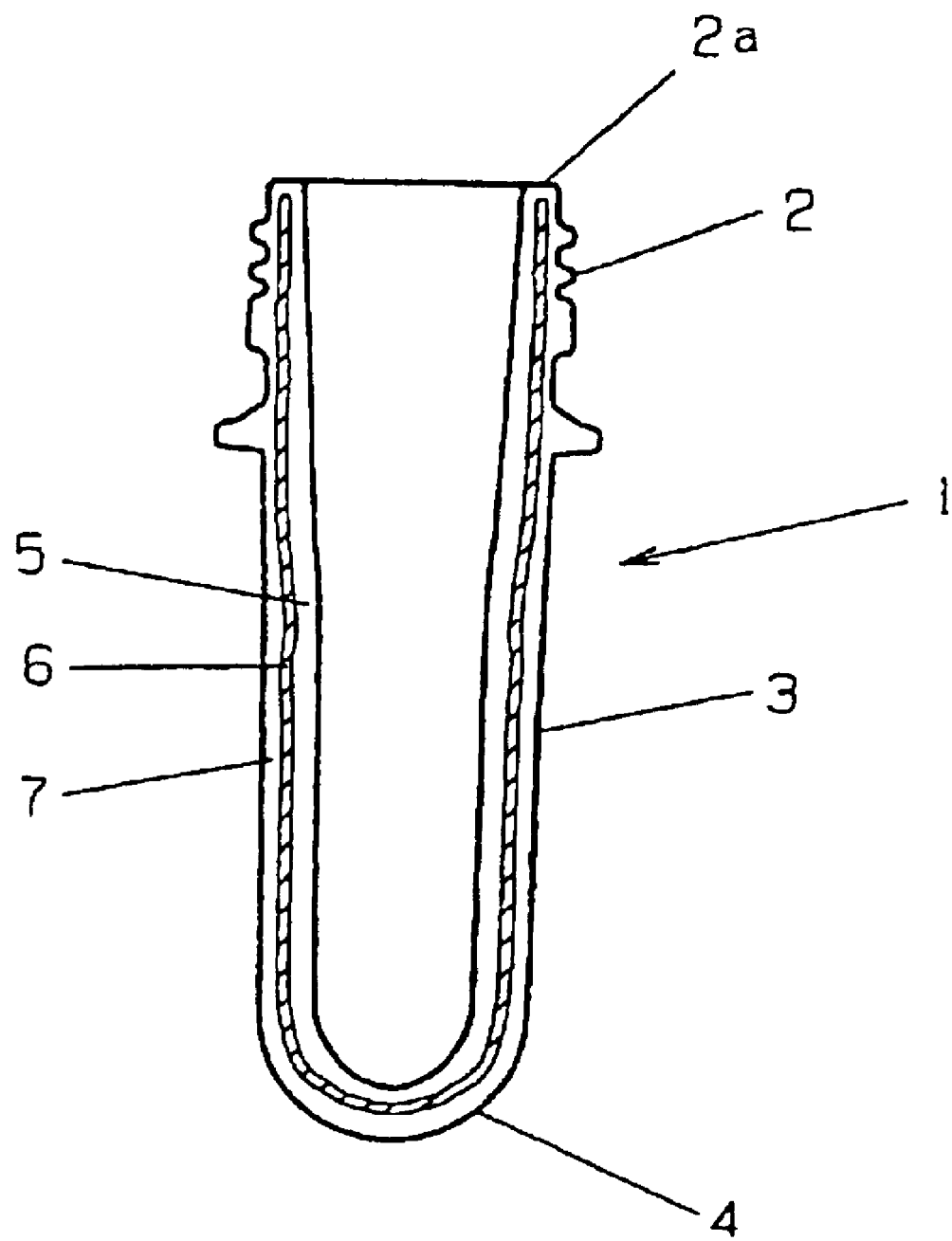
FIG. 2 is a cross-sectional view of an example of a multi-layered preform of the present invention.

In FIG. 2 which shows a cross-section of an example of a multi-layered preform of the present invention, the multi-layered preform 1 which is manufactured by performing the compression molding of a plural kinds of oriented thermoplastic resins is comprised of a mouth (or neck) portion 2, a body portion 3 and a bottom portion 4. Each portion of the multi-layered preform 1 except for an end portion 2a of the mouth portion 2 thereof is comprised of an inner layer 5, an intermediate layer 6 and an outer layer 7. Although the bottom portion 4 is formed in an approximately semi-spherical shape in this specific example, the bottom portion 4 is not limited to such a shape and may be formed in an elliptical shape or may have a distal end thereof flattened. At the center of the bottom portion 4 of the multi-layered preform 1, since the half-width of a diffuse scattering peak by the X-ray diffraction of the surface of the outer layer is larger than the half-width of the diffuse scattering peak by the X-ray diffraction of the surface of the inner layer, there substantially exists no possibility that the residual strains due to the flow orientation are generated so that the center of the bottom portion is made substantially transparent.

Figure 3:
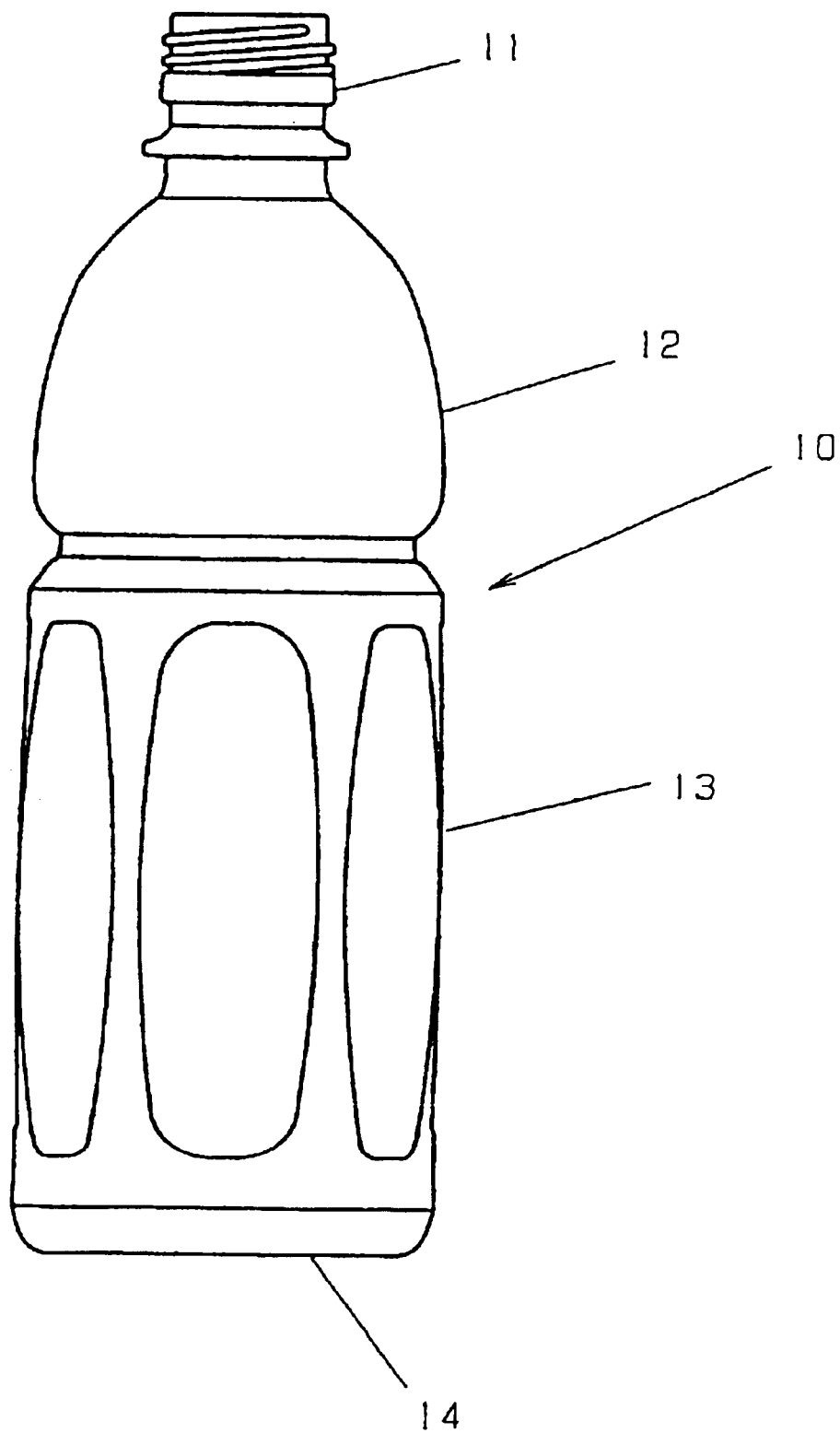
FIG. 3 is a front view showing an example of a multi-layered bottle of the present invention.
Figure 4:
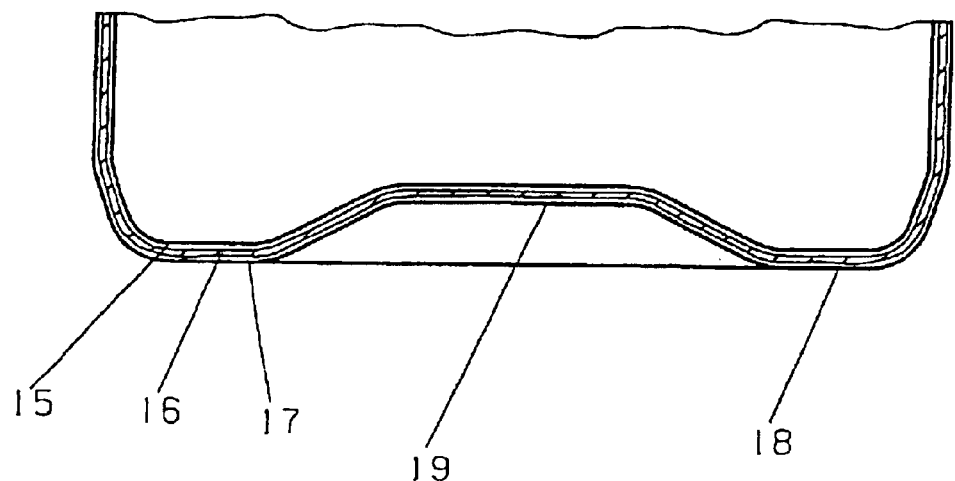
FIG. 4 is a cross-sectional view of a bottom portion of the multi-layered bottle shown in FIG. 3.

In FIG. 3 which shows an example of a multi-layered bottle of the present invention, a multi-layered bottle 10 which is manufactured by performing a compression molding of a plural kinds of oriented thermoplastic resins is comprised of a mouth portion 11, a shoulder portion 12, a body portion 13 and a bottom portion 14. Further, FIG. 4 is a cross-sectional view of the bottom portion of FIG. 3. As shown in the drawing, the bottom portion 14 is constituted of an inner layer 15, an intermediate layer 16 and an outer layer 17. In this specific example, the bottom portion 14 includes an annular ground portion 18 in a periphery thereof and a center dome portion 19 which is bulged upwardly 19. That is, the multi-layered bottle has a self-standing structure. However, the bottom portion 14 is not limited to this shape and may have a petaloid shape which has a plurality of leg portions or an approximately semispherical shape which exhibits an excellent pressure resistance.

With respect to this multi-layered bottle 10, at the center of the bottom portion 14 thereof, since a half-width of a diffuse scattering peak by an X-ray diffraction of a surface of the outer layer is larger than the half-width of the diffuse scattering peak by the X-ray diffraction of the surface of the inner layer, there substantially exists no possibility that the residual strains due to the flow orientation are generated so that the center of the bottom portion is made transparent.

On the other hand, with respect to the multi-layered preform which is obtained by a conventional injection molding, at the center of the bottom portion, the residual strains are always generated due to complicate flows of resins and the flow orientations of these flows and these residual strains give adverse effects to the physical properties, the resistance and appearance characteristics of a molded product. The flow orientation of the resin can be observed based on the half-width of the diffuse scattering peak in the X-ray diffraction measurement. In the injection molding method, the outer surface side of the resin is more subjected to the flow orientation than the inner surface side of the resin and hence, the half-width of the outer surface side of the resin becomes smaller than the half-width of the inner surface side of the resin. Further, with respect to the multi-layered preform obtained by the injection molding, the cooling speed of the bottom portion in the vicinity of the gate portion is low and hence, the whitening is liable to easily occur in the vicinity of the gate portion. Accordingly, it is difficult to obtain the transparent multi-layered preform or the multi-layered preform having the transparent bottom portion.

The inventors of the present invention have succeeded in finding a phenomenon that when the multi-layered preform is manufactured from the oriented thermoplastic resin such as polyester, polypropylene, polyimide or the like using the compression molding in such a manner that residual strains are nor substantially generated at the center of the bottom portion of the multi-layered preform, at the center of the bottom portion, the half-width of the diffuse scattering peak by the X-ray diffraction of the surface of the outer layer becomes larger than the half-width of the diffuse scattering peak by the X-ray diffraction of the surface of the inner layer so that the residual strains can be remarkably attenuated and, at the same time, the center of the bottom portion is efficiently cooled so that the flow orientations of respective resin layers are performed uniformly whereby the transparency of the bottom portion can be achieved. As a result, the multi-layered bottle obtained by performing the stretch blow molding using this multi-layered preform can exhibit the excellent impact resistance and the excellent environmental stress cracking resistance at the bottom portion so that the buckling strength is enhanced and there is no possibility of the occurrence of the crazing and the whitening thus providing the excellent appearance characteristics.

With respect to the multi-layered preform and the multi-layered bottle according to the present invention, as described above, the residual strains due to the flow orientation of the resin is remarkably attenuated at the bottom portion so that the bottom portion is efficiently cooled whereby advantageous effects that the multi-layered preform and the multi-layered bottle can exhibit the excellent impact resistance and the excellent environmental stress crack resistance, can eliminate the occurrence of the crazing and the whitening, and can exhibit the excellent appearance characteristics are obtained.

As the oriented thermoplastic resin which is used as the material of the inner layer and the outer layer of the present invention, any arbitrary resin can be used so long as the resin can be subjected to the stretch blow molding and can be crystallized under heat. Thermoplastic polyester such as polyethylene terephthalate, polybutylene terephtalate, polyethylene naphthalate, polycarbonate, polyarylate or a copolymer thereof or the like, a blend of these resins or a blend of these resins and other resins is preferably used. Ethylene-terephtalate-based thermoplastic polyester such as polyethylene terephtalate or the like can be more suitably used.

Further, acrylonitrile resin, polypropylene, propylene-ethylene copolymer, polyethylene or the like can be also used.

Into these resins, various kinds of additives, for example, a coloring agent, a ultraviolet lays absorption agent, a mold lubricant, a lubricant, a nucleus agent, an oxidation prevention agent, a charging prevention agent and the like can be blended within a range which does not damage the quality of a molded product.

In the ethylene-terephtalate-based thermoplastic polyester resin which is used for forming the inner layer and the outer layer in the present invention, the substantial portion, generally not less than 70 mol % of ester repeating units is occupied by the ethlene terephtalate units and it is preferable that the glass transition point (Tg) is set in a range from 50 to 90° C. and the melting point is set in a range from 200 to 275° C. In the ethylene-terephtalate-based thermoplastic polyester resin, polyethylene terephtalate (PET) exhibits the particularly excellent pressure resistance, heat resistance, heat-pressure resistance and the like. However, copolymer polyester which includes a small quantity of ester units formed of dibasic acid such as isophtalic acid, naphthalene dicarboxylic acid or the like and diol such as propylene glycol or the like besides the ethylene terephtalate units can be also used.

As the thermoplastic resin which can be used as the material of the intermediate layer of the present invention, any arbitrary resin can be used corresponding to purposes. For example, to give the gas barrier property to the intermediate layer, it is preferable to use resin such as polyamide resin including polyamide which contains xylylene group such as ethylene-vinyl alcohol copolymer or polymetaxylylene adipamido (product name: MXD6). To achieve the further enhancement of the oxygen barrier property, it may be possible to use a resin composition which blends a transition metal-based catalyst such as cobaltate, reduced iron, or the like into the gas barrier resin or the diene-based chemical compound.

Further, to recycle the resin which is used once, it is preferable to use blend material which is produced by blending a given quantity of recycled resin (resin (PCR) which is obtained by recycling the used bottle, the resin (SCR) which is generated in the inside of a manufacturing plant or a mixture thereof) of the same kind of virgin resin which is used as material for the inner layer or the outer layer into such virgin resin or only the recycled resin as the intermediate layer or the outer layer from the viewpoint of saving or the utilization of the resources. It may be possible to add a coloring agent to these resins.

Further, to give the heat resistance, polyarylate resin or polyethylene naphtalate resin can be used, while to give the water resistance, a cyclic olefin-based polymer such as ethylene-cyclic olefin copolymer or the like can be used. Further, when the intermediate layer is formed by combining a plurality of layers made of the above-mentioned resins, it becomes possible to give various functions to a molded product.

Further, to adhere the inner layer or the outer layer to the intermediate layer, an adhesive resin may be interposed between these layers. As the adhesive resin, an acid modified olefin-based adhesive agent which is subjected to graft polymerization of maleic acid or the like, an amorphous polyester-based adhesive agent, a polyamide-based adhesive agent or the like can be used.

As olefin-based resin which constitutes a base of the acid modified olefin-based adhesive agent, polyethylene, polypropylene, ethylene-α-olefin copolymer or the like can be preferably used. Further as acid modified monomer, carboxylic acid such as maleic acid, itaconic acid, fumaric acid or the like and anhydride thereof can be preferably used.

Suitable examples of the multi-layered structures of the present invention are shown hereinafter.

With respect to the abbreviations, respective layers of the multi-layered structure described below indicate as follows. That is, OTP indicates the oriented thermoplastic resin, GBR indicates the gas barrier resin, RCR indicates the recycled resin, ADR indicates the adhesive resin, OAR indicates the oxygen absorption resin composition, and COC indicates the cyclic olefin copolymer.

Following structures are listed as the multi-layered structures.

| Three-layered structure: | OTP/GBR/OTP, OTP/RCR/OTP, OTP/(OTP + RCR)/OTP |
| --- | --- |
| Four-layered structure: | OTP/GBR/RCR/OTP, OTP/GBR/OAR/OTP OTP/GBR/COC/OTP |
| Five-layered structure: | OTP/ADR/GBR/ADR/OTP OTP/ADR/OAR/ADR/OTP OTP/GBR/RCR/GBR/OTP OTP/ADR/(GBR + OAR)/ADR/OTP |
| Six-layered structure: | OTP/ADR/GBR/ADR/RCR/OTP OTP/ADR/OAR/ADR/RCR/OTP |
| Seven-layered structure: | OTP/RCR/ADR/GBR/ADR/RCR/OTP OTP/ADR/GBR/ADR/OAR/ADR/OTP |

The multi-layered preform of the present invention is formed such that resin B which constitutes the intermediate layer is intermittently supplied and is completely sealed in the inside of resin A which constitutes the inner layer and the outer layer in the inside of a multi-layered die of an extruder and a composite molten resin is continuously extruded, the extruded composite molten resin is cut at a position where only the resin A exists and the resin B does not exist so as to form a given quantity of composite molten resin lump, and thereafter the composite molten resin lump is supplied into the inside of a mold whereby the multi-layered preform having the mouth portion, the body portion and the bottom portion is formed using a female mold and a male mold.

Subsequently, the multi-layered compression molding method is explained in conjunction with FIG. 5.

Figure 5:
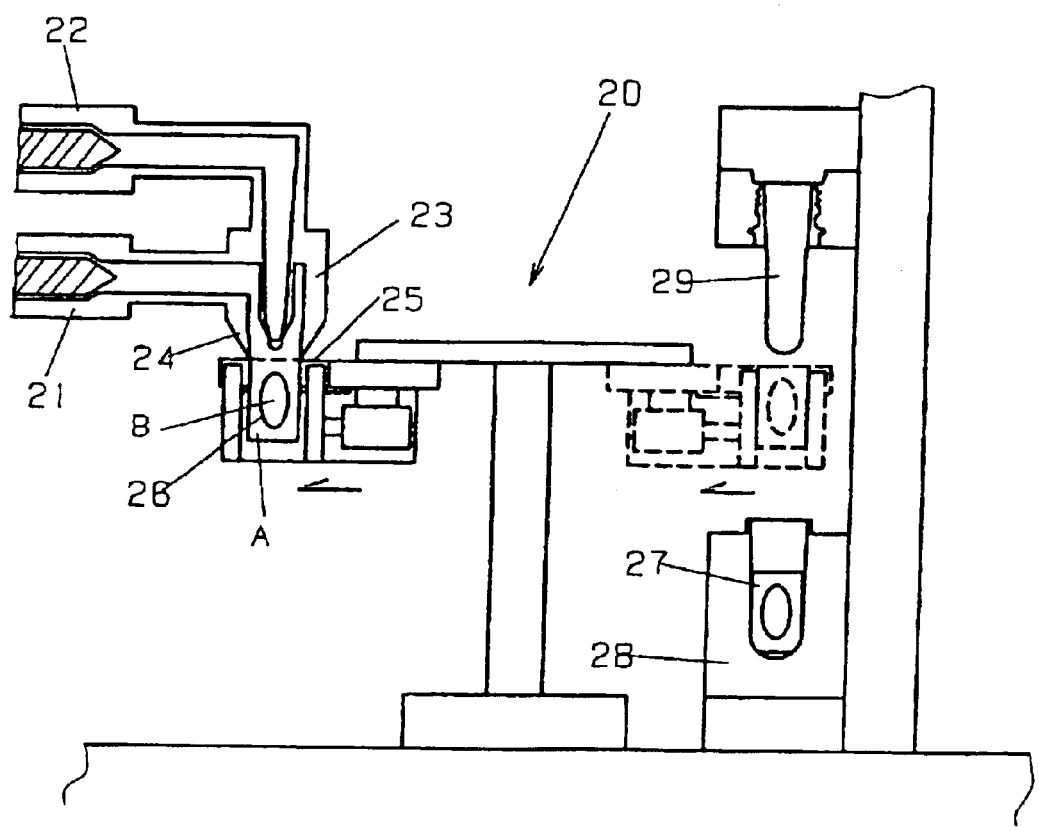
FIG. 5 is an explanatory view showing a whole structure of a multi-layer compression molding device.

FIG. 5 is an explanatory view showing the whole constitution of a multi-layered compression molding device 20. The resin A for inner and outer layers is continuously supplied from a main extruder 21. The resin B for intermediate layer is intermittently supplied from a sub extruder 22.

The melting and the extrusion are performed such that the resin A and the resin B are merged in the inside of a multi-layered die 23 and thereafter the resin A and the resin B are extruded from a nozzle 24 disposed below the multi-layered die 23 in a state that the resin A seals the resin B therein. The extruded composite molten resin 26 is cut into a given size at a portion thereof where the intermediate layer is not present using a cutting unit 25 which is movable in the horizontal direction. Immediately after the cutting operation, this cut composite molten resin lump 27 is transported to the inside of a female mold 28 of a compression molding device which is constituted of the female mold 28 and a male mold 29 in a state that the cut composite molten resin lump 27 is sandwiched by a jig. The composite molten resin lump 27 disposed in the inside of the female mold 28 is subjected to the compression molding using the male mold 29 so that the multi-layered preform 1 whose intermediate layer is sealed by the inner layer and the outer layer is molded.

Subsequently, the multi-layered bottle 10 is manufactured based on a known biaxial stretch blow molding method using this multi-layered preform 1.

The multi-layered preform of the present invention is manufactured by performing the compression molding of the composite molten material made of polyester, polyamide or the like. Further, the multi-layered preform has a mouth portion of the shape and the size which correspond to those of a mouth portion of a multi-layered bottle which constitutes a final product and a body portion and a bottom portion which are to be subjected to the stretch blow molding. However, the multi-layered preform of the present invention is characterized in that there exists substantially no possibility that the residual strains due to the flow orientation of the resin is generated at the bottom portion so that the occurrence of the whitening can be prevented. Further, since there exists no gate portion, no wrinkle is generated at the bottom portion.

The gate portion which is present in the multi-layered preform manufactured by the injection molding has many problems with respect to the productivity, the manufacturing cost and the characteristics of the final blow molded product. However, according to the multi-layered preform of the present invention, such a gate portion does not exist at all so that advantageous effects that a step for cutting the gate portion becomes unnecessary, the center of the bottom portion is smooth and homogeneous, and there exists no factor which becomes a cause of crystallization or whitening can be obtained.

The multi-layered bottle is manufactured by stretching the multi-layered preform of the present invention in the longitudinal direction using a stretching rod and in the lateral direction using blown air by a stretch blow molding method which is known per se at a stretching temperature which falls, for example, within a range from 85 to 120° C.

It is preferable to set the stretching magnification of the final multi-layered bottle to 1.2–6 times in the longitudinal direction and 1.2–4.5 times in the lateral direction. Further, in a usage which requires heat resistance, a heat set may be performed using means which is known per se.

[Experiment]

The present invention is further explained in conjunction with following experiments.

[X-ray Diffraction Measurement]

The center portions of the bottom portions of the multi-layered preform and the multi-layered bottle having a thickness of 1 mm were cut out and they were subjected to the measurement of the micro X-ray diffraction (PSPC-150C;

made by Rigaku Denki Co., Ltd.). The samples were set such that the thicknesswise direction of the bottom portion is aligned with the height direction of a measuring surface.

The measurement of the X-ray diffraction was performed under the conditions that a tube voltages was set to 30 KV, a tube current was set to 90 mA, a collimator was set to 100 µm and a measuring time was set to 600 seconds. The measuring positions of the sample were set at two positions, that is, a position which is 100 µm away from an inner surface of an innermost layer and a position which is 100 µm away from an outer surface of an outermost layer.

Figure 1:
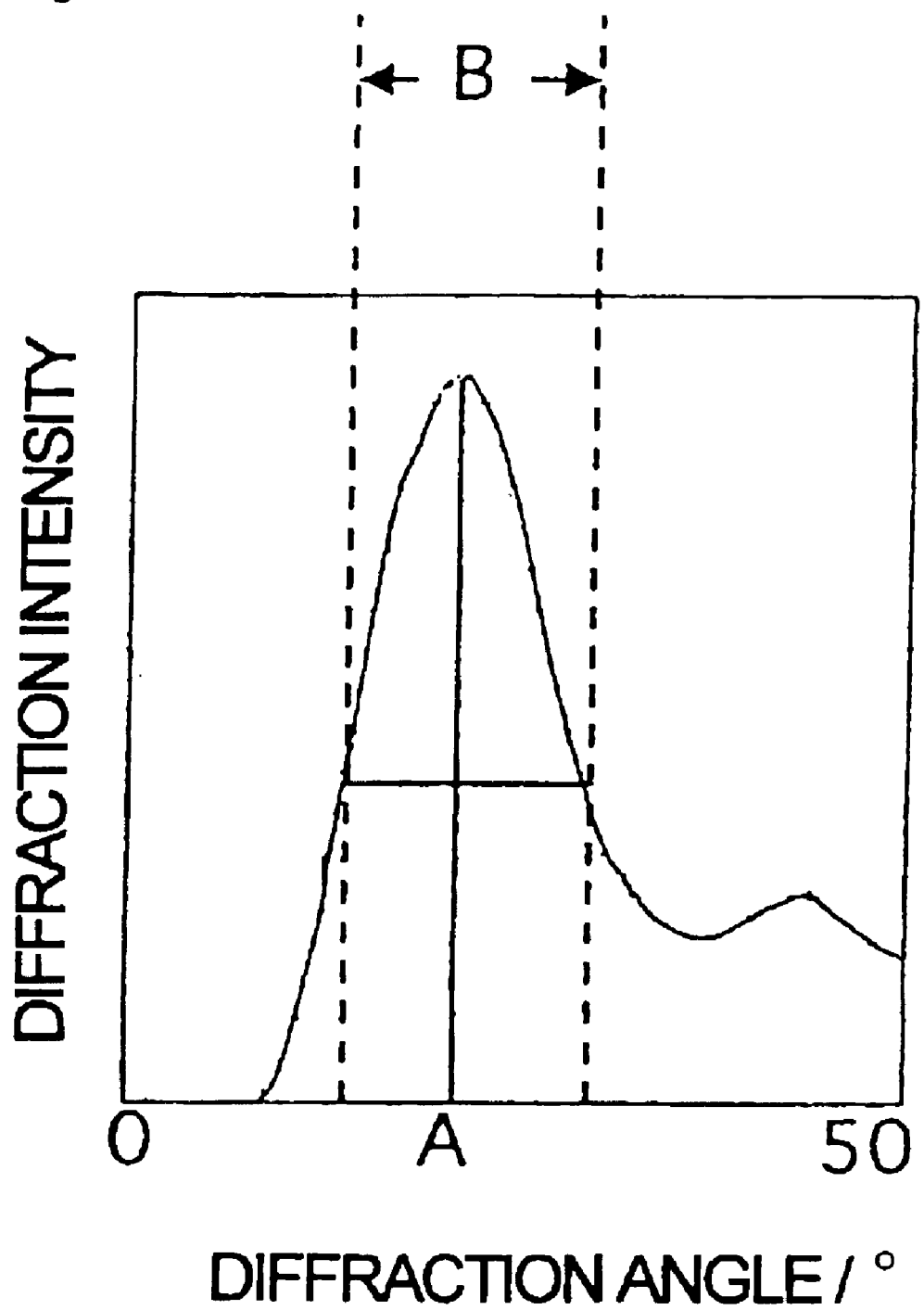
FIG. 1 is an explanatory view showing a peak position and a half-width in an X-ray diffraction.

By subtracting air scattering from the obtained X-ray diffraction profile, a diffuse scattering peak A and a half-width B° were obtained (FIG. 1).

[Appearance Evaluation Test]

10 pieces of the multi-layered preforms were prepared as samples and the presence or the non-presence of the whitening and the crazing at the center portions of the bottom portions of the multi-layered preforms were observed with naked eyes and the number of the multi-layered preforms which suffered from the occurrence of the whitening and the crazing was investigated.

[Preservation test]

10 pieces of the multi-layered bottles were prepared as samples and they were preserved for three weeks under the condition where the temperature was set to 30° C. and the relative humidity was set to 90% RH and the presence or the non-presence of the whitening and the crazing at the center portions of the bottom portions of the multi-layered bottles was observed with naked eyes and the number of the multi-layered bottles which suffered from the occurrence of the whitening and the crazing was investigated.

(Experiment 1)

Polyethylene terephthalate (PET) having an intrinsic viscosity of 0.75 dl/g was supplied to an extruder for inner layer and outer layer and polymetaxylylene adipamido (MXD6 made by Mitsubishi Gasu Kagaku Kabushiki Kaisha) was supplied to an extruder for intermediate layer. Under the condition that the die temperature was set to 270° C. and the resin pressure was set to 70 kgf/cm², these materials are extruded together such that the PET resin seals the MXD6 resin and they were cut into a given molten resin lump. This molten resin lump was set in the inside of a compression mold and the multi-layered compression forming was performed under the condition that the mold fastening pressure was set to 100 kgf/cm² thus manufacturing a three-layered preform whose inner layer and outer layer were made of the PET and whose intermediate layer was made of the MXD6. A unit weight (METSUKE) of the preform was 25 g and the ratio of the intermediate layer was 6 volume %.

(Experiment 2)

Except for that the resin which was produced by recycling the PET bottles collected from markets (PCR) was used as the intermediate layer, the multi-layered compression molding was performed under the same condition as the experiment 1 and a three-layered preform having the inner and outer layers made of the PET and the intermediate layer made of the recycled resin was manufactured. A unit weight (METSUKE) of the preform was 25 g and the ratio of the intermediate layer was 30 volume %.

(Experiment 3)

The three-layered preform of the first experiment was heated up to a temperature of 110° C. which is not less than the glass transition point of the PET and this preform was set in the inside of a mold which is heated up to 60° C. and a biaxial stretch blow molding was performed thus obtaining the three-layered bottle having a content of 500 cc.

(Experiment 4)

Using the three-layered preform of the experiment 2, the biaxial stretch blow molding was performed under the same condition as the experiment 3 thus obtaining a three-layered bottle having a content of 500 cc.

COMPARISON EXAMPLE 1

The PET used in the experiment 1 was supplied to an extruder for inner and outer layers and the MXD6 was supplied to an extruder for intermediate layer. These materials were injected and molded together in an injection mold under the condition that the temperature of an injection nozzle was set to 280° C. and the resin pressure was set to 250 kgf/cm2 thus manufacturing a three-layered preform having inner and outer layers made of the PET and an intermediate layer made of MXD6. A unit weight (METSUKE) of the preform was 25 g and the ratio of the intermediate layer was 6 volume %. Here, a gate portion is cut within 1 mm.

COMPARISON EXAMPLE 2

Except for that the recycled resin (PCR) was used as the intermediate layer, the multi-layered injection molding was performed under the same condition as the comparison example 1 and a three-layered preform having the inner and outer layers made of the PET and the intermediate layer made of the recycled resin was manufactured. A unit weight (METSUKE) of the preform was 25 g and the ratio of the intermediate layer was 30 volume %.

COMPARISON EXAMPLE 3

Using the three-layered preform of the experiment 1, the biaxial stretch blow molding was performed under the same condition as the experiment 3 thus obtaining a three-layered bottle having a content of 500 cc.

COMPARISON EXAMPLE 4

Using the three-layered preform of the experiment 2, the biaxial stretch blow molding was performed under the same condition as the experiment 3 thus obtaining a three-layered bottle having a content of 500 cc.

The result of the X-ray diffraction measurement of these multi-layered preforms and multi-layered bottles was shown in Table 1. With respect to the multi-layered preforms of the experiments 1 and 2, at the center portion of the bottom portion, the half-width of the surface of the outer layer is larger than the half-width of the surface of the inner layer. To the contrary, with respect to the multi-layered preforms of the comparison examples 1 and 2, at the center portion of the bottom portion, the half-width of the surface of the outer layer is smaller than the half-width of the surface of the inner layer. This implies that the former exhibits the higher flow orientation in the inner layer than in the outer layer, while the latter exhibits the higher flow orientation in the outer layer than in the inner layer. Further, this implies that the half-widths of the inner layer and the outer layer of the former are greater than the half-widths of the inner layer and the outer layer of the latter and hence, the former exhibits the smaller flow orientation than the latter.

Further, reflecting the difference between the former and the latter in the flow orientation and the cooling efficiency of the resin, although the whitening was not observed with respect to the multi-layered preforms of the experiments 1 and 2, the whitening was observed with respect to the multi-layered preforms of the comparison examples 1 and 2.

With respect to the multi-layered bottles of the experiments 3 and 4, at the center portion of the bottom portion, the half-width of the surface of the outer layer is larger than the half-width of the surface of the inner layer and the occurrence of the crazing and the whitening was not recognized and no gate portion was present thus exhibiting the favorable appearance. To the contrary, with respect to the multi-layered bottles of the comparison examples 3 and 4, at the center portion of the bottom portion, the half-width of the surface of the outer layer is smaller than the half-width of the surface of the inner layer and the crazing and the whitening occurred and the trace of the gate portion was present.

TABLE 1

| | Half-width of diffuse scattering peak | | Whitening of bottom portion | Crazing of bottom portion |
|---|---|---|---|---|
| | Outer layer | Inner layer | | |
| Experiment 1 | 17.6° | 15.3° | 0 | 0 |
| Experiment 2 | 16.5° | 15.4° | 0 | 0 |
| Experiment 3 | 17.2° | 15.0° | 0 | 0 |
| Experiment 4 | 16.2° | 15.1° | 0 | 0 |
| Comparison example 1 | 14.3° | 15.2° | 2 | 0 |
| Comparison example 2 | 14.9° | 15.1° | 3 | 0 |
| Comparison example 3 | 14.0° | 14.9° | 4 | 5 |
| Comparison example 4 | 14.5° | 14.7° | 6 | 6 |

According to the present invention, with respect to the multi-layered preform manufactured by the compression molding of the oriented thermoplastic resin, the residual strains due to the flow orientation of respective resins are not substantially generated at the bottom portions thereof, the occurrence of the whitening is prevented and there exists no gate portion. Further, with respect to the multi-layered bottle manufactured by performing the biaxial stretch blow molding of the multi-layered preform, the respective resin layers at the bottom portion are homogeneously and uniformly stretched and, at the same time, the residual strains due to the flow orientation which are liable to be generated at the bottom portion are attenuated so that the impact resistance and the buckling strength of the bottom portion are enhanced, the excellent environmental stress cracking resistance is obtained, and the gate portion is not present at the bottom portion and the whitening is not present thus exhibiting the excellent appearance characteristics.

What is claimed is:

1. A multi-layered, compression molded preform which is capable of being reshaped to a multi-layered bottle, said preform comprising
    a mouth portion, a body portion and a bottom portion, wherein at least the body portion and the bottom portion comprise an inner layer, one or more intermediate layers, and an outer layer,
    said preform having a molecular orientation and shape produced by compression molding a composite molten resin lump (27),
    wherein, at the center of the bottom portion, a half-width of a diffuse scattering peak by an X-ray diffraction of a surface of the outer layer is larger than a half-width of a diffuse scattering peak by an X-ray diffraction of a surface of the inner layer;
    wherein at least one of said one or more intermediate layers is made of at least one material selected from the group consisting of gas barrier resin, recycled resin and heat-resistant resin;
    wherein said one or more intermediate layers are completely sealed by the inner layer and the outer layer which are made of polyester; and
    a gate portion or a trace of the gate portion is not present in the bottom portion.

2. The compression molded preform of claim 1, wherein said body portion is a closed body portion.

3. A multi-layered, compression molded preform according to claim 1, wherein an adhesive resin layer is interposed at least either between the inner layer and the intermediate layer or between the outer layer and the intermediate layer.

4. A multi-layered bottle which is a product of a biaxial stretch blow molding of the multi-layered compression molded preform according to claim 3, wherein
    the multi-layered bottle includes a mouth portion, a shoulder portion, a body portion and a bottom portion,
    at least the shoulder portion, the body portion and the bottom portion include an inner layer, an intermediate layer and an outer layer, and,
    at the center of the bottom portion, a half-width of a diffuse scattering peak by an X-ray diffraction of a surface of the outer layer is larger than a half-width of a diffuse scattering peak by an X-ray diffraction of a surface of the inner layer.

5. The multi-layered preform of claim 1 having a generally cylindrical and elongated shape, with said bottom portion being closed.

6. A multi-layered bottle which is a product of a biaxial stretch blow molding of the multi-layered compression molded preform according to claim 3, wherein
    the multi-layered bottle includes a mouth portion, a shoulder portion, a body portion and a bottom portion,
    at least the shoulder portion, the body portion and the bottom portion include an inner layer, an intermediate layer and an outer layer, and,
    at the center of the bottom portion, a half-width of a diffuse scattering peak by an X-ray diffraction of a surface of the outer layer is larger than a half-width of a diffuse scattering peak by an X-ray diffraction of a surface of the inner layer.

7. The multi-layered and compression molded preform of claim 1 wherein said mouth portion comprises an external thread, and said bottom portion being closed.

8. A multi-layered bottle which is a product of a biaxial stretch blow molding of the multi-layered compression molded preform according to claim 7, wherein
    the multi-layered bottle includes a mouth portion, a shoulder portion, a body portion and a bottom portion,
    at least the shoulder portion, the body portion and the bottom portion include an inner layer, an intermediate layer and an outer layer, and,
    at the center of the bottom portion, a half-width of a diffuse scattering peak by an X-ray diffraction of a surface of the outer layer is larger than a half-width of a diffuse scattering peak by an X-ray diffraction of a surface of the inner layer.

9. A multi-layered bottle which is a product of a biaxial stretch blow molding of the multi-layered compression molded preform according to claim 1, wherein
    the multi-layered bottle includes a mouth portion, a shoulder portion, a body portion and a bottom portion,
    at least the shoulder portion, the body portion and the bottom portion include an inner layer, an intermediate layer and an outer layer, and, at the center of the bottom portion, a half-width of a diffuse scattering peak by an X-ray diffraction of a surface of the outer layer is larger than a half-width of a diffuse scattering peak by an X-ray diffraction of a surface of the inner layer.

10. A method of making a multi-layered bottle according to claim 9, comprising forming a molten resin lump comprising a first molten resin surrounded by a second molten resin, and wherein said second molten resin is surrounded by a third molten resin, compression shaping said composite molten resin lump into a multi-layered preform having a mouth portion, a body portion and a bottom portion, wherein at least the body portion and the bottom portion comprise an inner layer, an intermediate layer and an outer layer, and axial stretch blow molding said multi-layered compression molded preform into a multi-layered bottle.

11. A method of forming a multi-layered, compression molded preform according to claim 1, said compression molded preform being adapted to be reshaped to a multi-layered bottle, comprising forming a molten resin lump comprising a first molten resin surrounded by a second molten resin, and wherein said second molten resin is surrounded by a third molten resin, and compression shaping said composite molten resin lump into a multi-layered preform having a mouth portion, a body portion and a bottom portion, wherein at least the body portion and the bottom portion comprise an inner layer, an intermediate layer and an outer layer.

* * * * *